United States Patent [19]

Lamb

[11] Patent Number: 4,781,757

[45] Date of Patent: Nov. 1, 1988

[54] COATING COMPOSITION

[75] Inventor: Werner Lamb, Emden, Fed. Rep. of Germany

[73] Assignee: Desert Tool and Supply, Inc., Las Vegas, Nev.

[21] Appl. No.: 14,849

[22] Filed: Feb. 13, 1987

[51] Int. Cl.$^4$ ................................................ C09G 1/06
[52] U.S. Cl. ........................................ 106/11; 106/8; 106/9
[58] Field of Search ..................... 106/15.05, 11, 18, 8, 106/9

[56] References Cited

U.S. PATENT DOCUMENTS

| | | | |
|---|---|---|---|
| 1,362,907 | 12/1920 | Walsh | 106/11 |
| 1,453,723 | 5/1923 | Olsen | 106/9 |
| 1,544,244 | 6/1925 | Darlinton | 106/9 |
| 1,689,864 | 10/1928 | Darlinton | 106/8 |
| 1,819,736 | 8/1931 | Costiqan | 106/8 |
| 3,395,028 | 7/1968 | Mackles | 106/8 |

Primary Examiner—Paul Lieberman
Assistant Examiner—Helene Kirschner
Attorney, Agent, or Firm—Jerry R. Seiler

[57] ABSTRACT

A coating composition consists essentially of a major amount of light mineral oil and a small amount of eucalyptus oil, preferably between about 0.01 and about 1%, by volume.

9 Claims, No Drawings

COATING COMPOSITION

BACKGROUND OF THE INVENTION

A number of coating compositions have been proposed for various substrates and surfaces. Normally, different compositions are required for each such coating, depending on whether it is for marine, household, or other such use. The present invention is directed to a unique composition intended to serve as a protective coating as well as a preservative, for restoring oxidized paint, as a penetrant for alkali, and the like.

SUMMARY OF THE INVENTION

The unique combination of ingredients of the present invention consists essentially of a mineral oil, particularly a very light mineral oil, often referred to as a white mineral oil or liquid petrolatum, and a small amount of eucalyptus oil.

DETAILED DESCRIPTION OF THE PREFERRED EMBODIMENTS

The major component of the coating composition of the present invention is a mineral oil, preferably a light mineral oil, particularly a white mineral oil, often referred to as liquid petrolatum. Such material is a colorless, transparent, oily liquid, comprising a mixture of liquid hydrocarbons. An example of a preferred oil is Gold Metal 100 obtained from Lubricating Specialities Company, comprising a very pure technical grade of white oil conforming to FDA Reg. 21 CFR 1783620(b). Other technical grade white oils may also be used, which materials are well known to those skilled in the art.

The other essential component of the composition is eucalyptus oil, NF grade having a specific gravity at 25° C. of 0.905 –0.925. The amount of eucalyptus oil used is preferably between about 0.01 and about 1%, by volume in the final composition. It is also useful to prepare a concentrate in which the eucalyptus oil will be present between about 8 and about 20%, by volume, with the white mineral oil also being present in a major amount, by volume. In order to enhance the solubility or mixing of the eucalyptus oil in the white mineral oil, it may be desired to use a small amount of ether or alcohol, for example, between about 0.01 and about 5%, by volume, based on the amount of eucalyptus oil. The preferred alcohol is ethyl alcohol, and the preferred ether is ethyl ether.

In addition to the aforesaid essential mineral oil and eucalyptus oil ingredients, a coloring agent is also optionally, but preferably, used. The type of coloring agent and its color is not critical, but it should be readily miscible or soluble in an oil composition. For this purpose, it may be desirable to utilize a powdered coloring agent premixed in alcohol or other solvent which then can be mixed into the composition. Typical coloring agents which are suitable include Pylakrome coloring agents obtained from Pylam Products Company, Inc., well known to those skilled in the art.

A preferred method of preparing the composition of the invention comprises dissolving the coloring agent in alcohol, mixing the alcohol coloring agent solution with the eucalyptus oil and then introducing that composition into the white mineral oil. In this manner, a concentrate may be made which then can be diluted with the remaining white mineral oil, the concentrate being easily shipped and handled and then diluted with pure mineral oil. Typically, the amount of coloring composition, preferably as the ethanol solution, will be between about 0.02 and about 2%, by volume of the total coating composition, or between about 10 and about 25% of the concentrate. However, any suitable amount of coloring agent may be used to produce the desired color.

An example of preparing a preferred composition comprises dissolving a suitable Pylakrome coloring agent (2.5 teaspoons) in 3.5 ounces (100 ml) of denatured alcohol. The composition is stirred vigorously until the coloring agent or toner is completely dissolved. The coloring solution is then added to 2 ounces of eucalyptus oil (N.F.), stirred vigorously and allowed to sit for 5 minutes. The resulting composition is then introduced slowly into 15 ounces of white mineral oil and shaken vigorously. This concentrate is then diluted with 50 gallons of the oil to produce the final preferred composition. The white mineral oil used is Gold Medal 100 having the following typical values: Gravity, 29.5 API, Flash Point, 325° F., Viscosity: SUS 100° F.: 102, SUS 210° F. 38.6.

The above composition is useful for restoring oxidized paint, particularly on automobiles, as a preservative for wood, vinyl, leather and rubber, penetrates alkali on wood, particularly useful for marine-exposed woods, and weatherproofs such materials or surfaces. These as well as other advantages of the composition within the purview of the invention will be evident to those skilled in the art.

I claim:

1. A coating composition consisting essentially of a major amount of mineral oil and between about 0.01 and about 1.0% eucalyptus oil, by volume.

2. A composition of claim 1 wherein said mineral oil comprises liquid petrolatum.

3. A composition of claim 1 wherein said mineral oil comprises white mineral oil.

4. A composition of claim 1 including between about 0.01 and about 5% of a solvent selected from the group consisting of ether and alcohol by volume, based on the amount of said eucalyptus oil.

5. A composition of claim 1 including between about 0.005 and about 0.2% by volume of coloring agent.

6. A composition of claim 3 wherein the amount of eucalyptus oil is between about 0.01 and about 0.1%, by volume.

7. A composition of claim 1 including between about 0.02 and about 2.0% coloring composition consisting essentially of ethanol and an alcohol soluble coloring agent.

8. The composition of claim 1 wherein the amount of eucalyptus oil is between about 0.01 and about 0.1%, by volume, and including between about 0.01 and about 5% of a solvent selected from the group consisting of ether and alcohol, by volume, based on the amount of said eucalyptus oil.

9. A method of cleaning and polishing metal, vinyl, wood, leather and rubber surfaces comprising applying a composition of claim 1 on such surface, and wiping said composition on said surface with a cloth.

* * * * *